April 5, 1966  H. SCHMIDT, JR., ET AL  3,244,286
FILTRATION APPARATUS
Filed Nov. 18, 1963  4 Sheets-Sheet 1

INVENTORS
Henry Schmidt, Jr.
BY Earl A. Borre
Fidler, Bradley
Patnaude & Batterbridge
ATTORNEYS INVENTORS
Henry Schmidt, Jr.
Earl A. Borre
BY Fiedler, Bradley,
Watnaude and Fetherbridge
ATTORNEYS

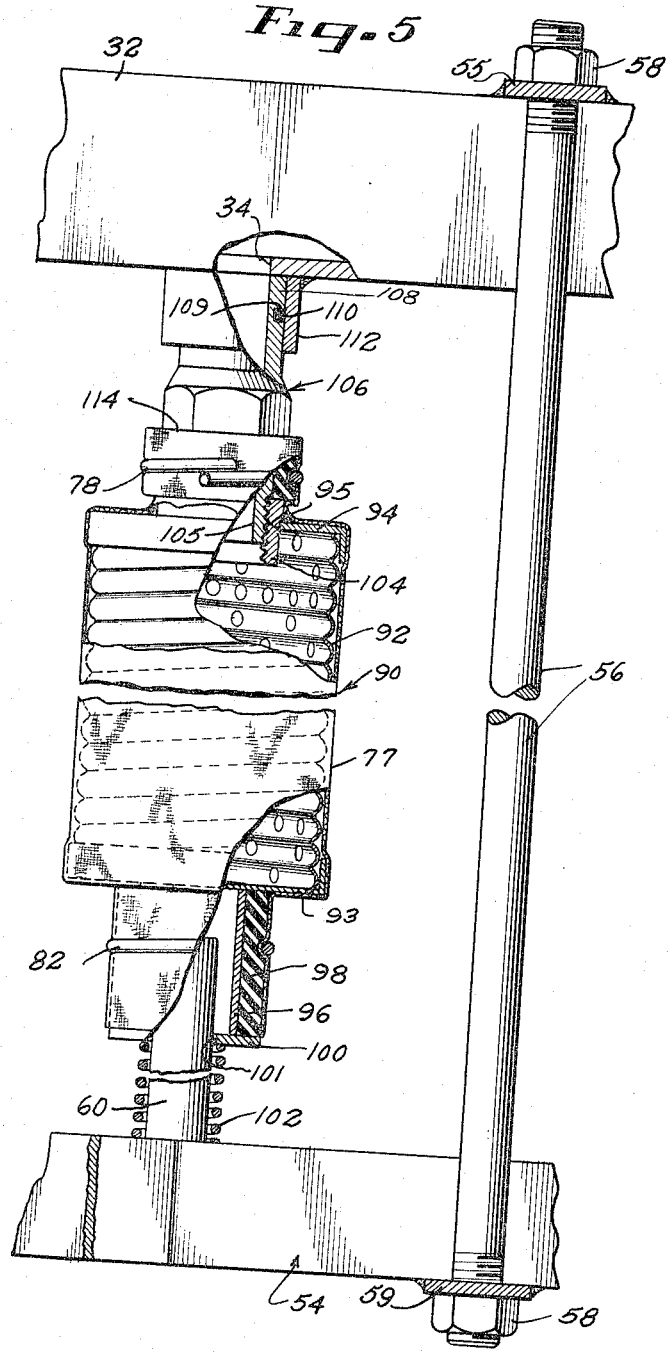

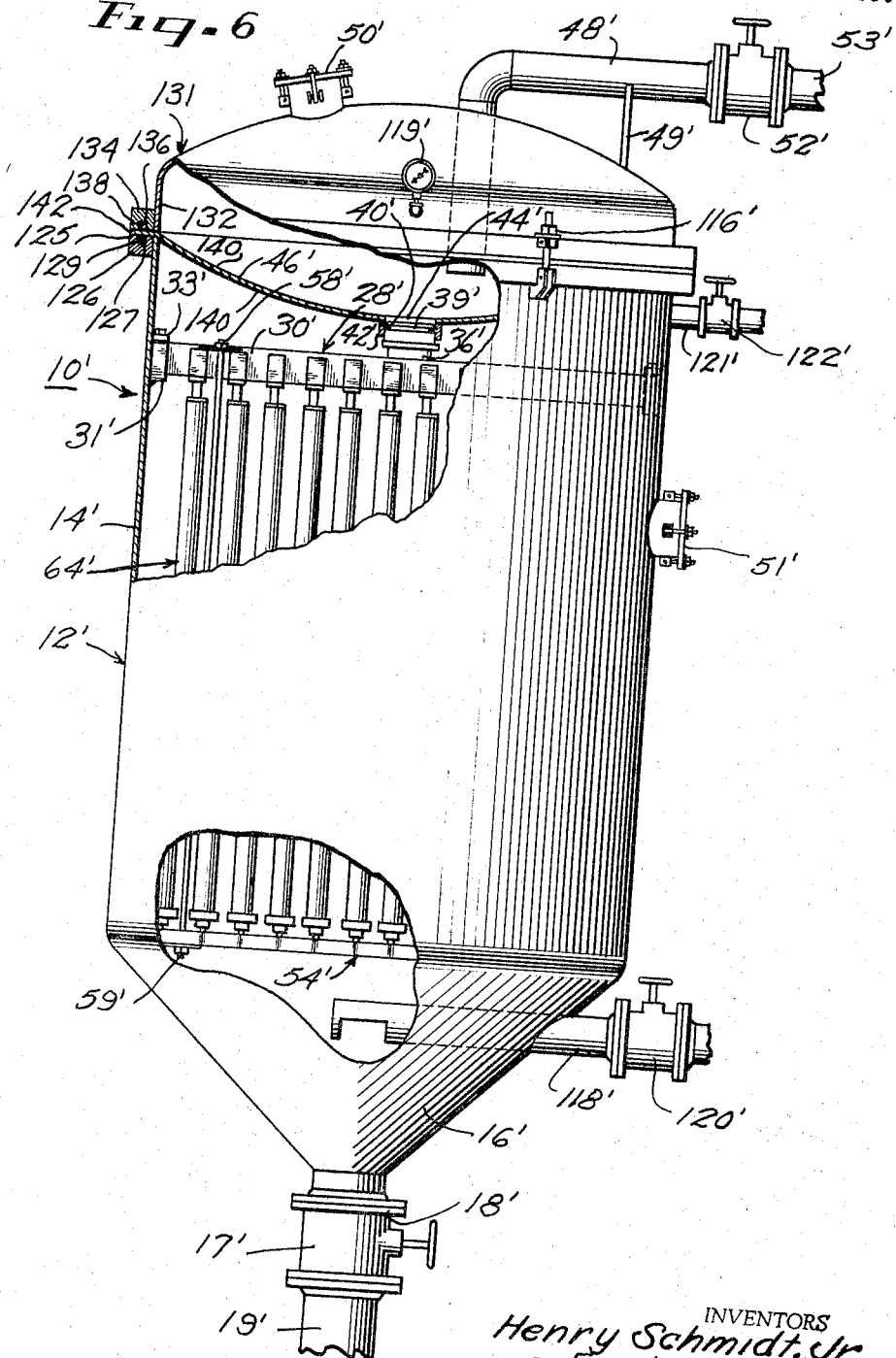

3,244,286
FILTRATION APPARATUS
Henry Schmidt, Jr., Hinsdale, and Earl A. Borre, Itasca, Ill., assignors to Industrial Filter & Pump Mfg. Co., Cicero, Ill., a corporation of Illinois
Filed Nov. 18, 1963, Ser. No. 324,413
15 Claims. (Cl. 210—333)

The present invention generally relates to filtration apparatus for removing entrained solids suspended in a liquid, and it more particularly relates to a new and improved filter employing tubular filter elements and a dome chamber for causing a high velocity reverse flow of liquid through the tubular filter elements to remove a filter cake deposited on the outside surfaces of the elements during the normal filtration cycle. The filter of the present invention is operationally similar to the filter described in a co-pending application Ser. No. 167,743 filed January 22, 1962, by James F. Zievers and Earl A. Borre, now abandoned and assigned to the same assignee as the present invention.

Filters of this general type ordinarily employ a plurality of perforated tubular filter elements which are interconnected between the inlet and outlet portions of the unit so that as the fluid to be clarified passes from the inlet to the outlet it must pass through a porous filter cake deposited on the perforate walls of the filter elements. Accordingly, the entrained solids are removed from the liquid. As the solids are thus deposited on the filter elements the porous cakes which adhere to the outside surfaces thereof continue to increase in thickness until the filter cakes reach some predetermined thickness where operational efficiency is impaired. At this time, the cakes must be removed in order to provide efficient operation of the system. Removal of the filter cakes is commonly referred to as a filter cleaning operation and is accomplished in certain types of filters by reversing the flow of liquid through the filter elements thereby to dislodge the cakes. The dislodged cake thus falls to the bottom of the filter chamber and passes out through a drain port.

Tubular filters frequently incorporate a dome chamber located above the filter tubes on the outlet side thereof in order to trap air which is first compressed and thereafter permitted to expand to drive a quantity of liquid located in the dome back through the tubes. The present invention is particularly concerned with this latter type of tubular filter and it is described in connection with such a filter. However, certain features of the present invention will be readily understood by those skilled in the art to be applicable to other types of filtration apparatus.

In the filter described in the above-identified copending application there is provided a tube sheet which is in the nature of a flat plate removably positioned across the top of the filter tank directly beneath the cover. It is this tube sheet which separates the dome chamber in the cover from the principal filter chamber in the tank and it is this same tube sheet which supports the tubular filter elements which depend through respective ones of a plurality of openings in the tube sheet. The tubular filter elements in this filter depend freely into the tank and since in many applications they are relatively long and the operational pressures are relatively great, movement of the lower portions of the tubes takes place during a filter cycle. Since such movement makes it difficult to employ automatically operated auxiliary equipment to detect the thickness of the cake on the filter elements, and since such movement causes a redistribution of the hydraulic pressures within the tank, possibly overloading one or more of the elements, it would be desirable to provide means for preventing the tubular filter elements from moving within the filter tank during a filter cycle. Moreover, it would be desirable to accurately control the hydraulic pressures and liquid distribution to the filter elements during a normal filter cycle and also during a filter cleaning operation when a high velocity flow of liquid occurs in a reverse direction through the filter elements.

Even with the best and most modern types of cake thickness detectors and where a maximum of human observation, commensurate with the economics of the situation, is employed, there are times when the normal filter cycle continues until the space in the filter tank between the filter tubes is completely filled with the filter cake. This condition is sometimes referred to as "cake bridging" inasmuch as the spaces between the filter elements are bridged by the excessively large mass of separated solids. When this condition occurs removal of the cake is extremely difficult and in many cases results in a filter being shut down for several hours while the filter tubes and the tube sheet are worked loose from a heavy, sticky, cake. Moreover, when cleaning such a cake from the filter, damage to the relatively fragile filter elements frequently occurs.

Therefore, an object of the present invention is to provide a tubular filter of this general type wherein the tube sheet is eliminated, thereby to facilitate access to the filter cake when the cover is removed from the tank.

Another object of the present invention is to provide a new and improved filter tube mounting construction for facilitating removal and replacement of the filter elements.

A further object of the present invention is to provide a new and improved filter employing filter tubes which is less expensive to manufacture than prior art type filters and which provides a greater filtering area for a given size tank than prior art filters.

Briefly, the above and further objects are realized in accordance with the present invention by providing, in one embodiment thereof, a removable cover member having a dome type chamber integrally formed therein exclusively of any parts mounted on or in the filter tank with which it is connected, and a manifold comprising a plurality of interconnected conduits mounted in the tank near the top thereof and removably connected to the chamber in the cover when the cover is placed on the tank. The tubular filter elements are supported by the manifold and held apart at the bottom by a spacer structure located near the bottom of the tank. The said manifold conduits have a plurality of downwardly facing openings which respectively communicate with the cavities in the filter elements. In one embodiment of the invention the tubular filter elements are held in place by a force exerted thereon by spring means mounted on the spacer thereby to facilitate removal of the filter elements from the assembly.

In another embodiment of the invention the dome chamber is defined between the cover and a downwardly dished, imperforate partition member which is removably and sealably mounted between the cover and the tank. In other respects the filter of this embodiment is like that described above and it has certain advantages over the previously described embodiment when used in particular applications. For example, where the filtrate is highly corrosive it is necessary to coat the walls of the dome chamber with a non-corrodable material such, for example, as rubber. Coating the walls of the dome is a difficult operation when the partition is an integral part of the cover. Also, the cost of manufacturing this latter type of filter is less than that of the first embodiment and moreover assembly of the cover and the partition onto the tank may be facilitated.

Further objects and advantages and a better understanding of the present invention will be had by reference to the following detailed description taken in connection with the accompanying drawings in which:

FIG. 3 is a fragmentary, partially sectioned view of a tubular filter element embodying certain features of the invention;

FIG. 5 is a fragmentary, partially sectioned view of another filter tube mounting construction embodying certain features of the present invention; and FIG. 6 is an elevational view of a tubular filter embodying other features of the present invention, portions of the cover and tank being broken away in order to show the interior thereof.

Figure 1:
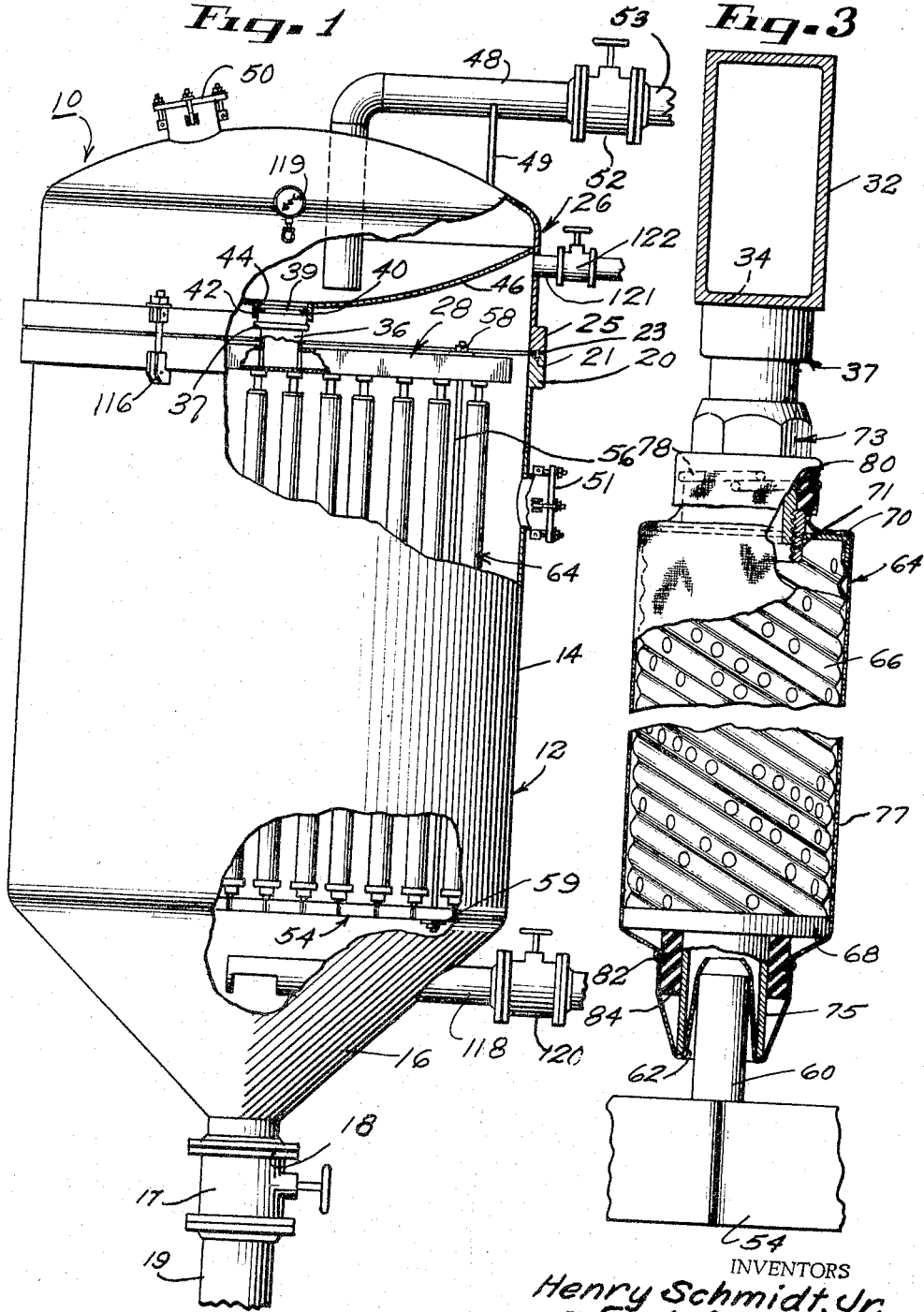
FIG. 1 is an elevational view of a tubular filter embodying certain features of the present invention, portions of the cover and tank being broken away in order to show the interior thereof.
Figure 2:
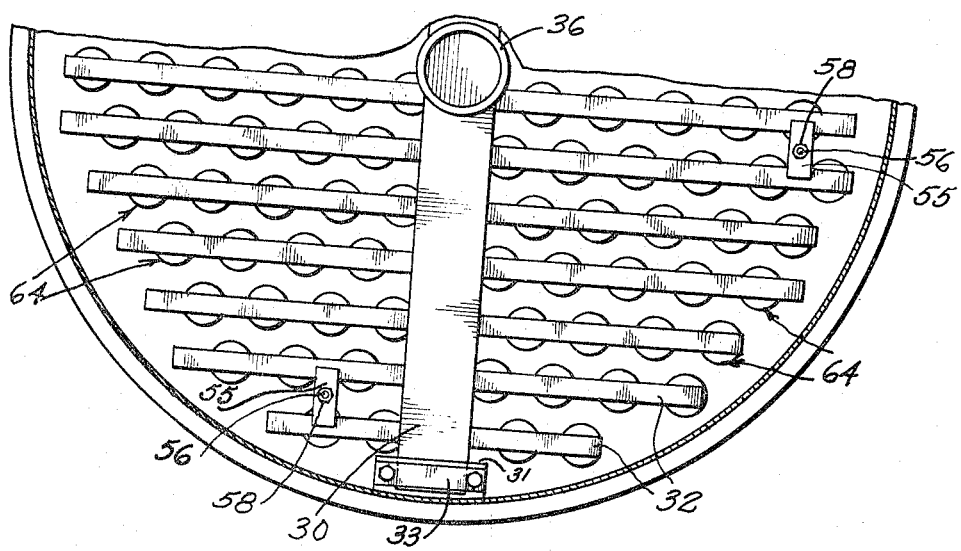
FIG. 2 is a view, partly broken away, looking down into the top of the filter tank of FIG. 1 with the cover thereof removed.

Referring now to the drawings and more particularly to FIGS. 1–4 thereof, there is shown a vertically disposed filter 10 comprising an upright tank 12, which is mounted by suitable means not shown in the drawing. The tank 12 consists of a hollow, cylindrical central section 14 open at the top, and a generally conical lower section 16 which terminates at the bottom in a drain port 18 which is adapted to be connected through suitable valve 17 to a drain line 19. About the periphery at the top of the tank portion 14 there is provided an annular flange 20 having a circumferential groove 21 in the top surface thereof for receiving a sealing and locating ring 23 which is pressed between the flange 20 and a similar flange 25 surrounding the bottom opening of a dome cover 26. A manifold 28 comprises a principle tubular header member 30 (FIG. 2) from which a plurality of lateral conduits 32 extend in mutually parallel relationship. The header 30 is mounted in the tank by a pair of brackets 31 fixed to the tank 12 and having respective U-shaped members 33 secured thereto over the header 30. As best shown in FIG. 3 the lateral conduits 32, which are identical to one another in cross-section, have a vertical height substantially twice that of their respective horizontal widths whereby to provide a structure which is sufficiently strong to support the filter elements and which provides a large flow area while occupying a relatively small horizontal area.

The lateral conduits 32 each have a plurality of downwardly facing openings 34 over which are secured, as by welding, hollow connector members 37 each having an internal pipe thread at the lower end thereof for sealably receiving filter elements in a manner described more fully hereinafter. The lateral conduits 32 are suitably secured to the principal header 30, as by welding, with the interiors of the lateral conduits 32 communicating with the cavity in the header 30. The opposite or outer end of each of the lateral conduits 32 is blocked off by suitable means such as a plate welded thereto.

Extending upwardly from the header 30 is an inlet-outlet tube 36 which, as best shown in FIG. 1, has an external annular flange 37 spaced from the top thereof and an annular groove 39 for receiving a resilient sealing ring 40. As best shown in FIG. 1, the upper end of the inlet-outlet tube 36 is slidably received in a flat ring or tube 42 which surrounds an opening 44 centrally disposed in a partition member 46 which extends across the cover 26. With the cover 26 in place as shown in FIG. 1, the dome chamber defined in the cover 26 above the partition 46 communicates with each of the lateral conduits 32 through the inlet-outlet tube 36 and the principal header 30. An outlet conduit 48 is partly supported by a bracket 49 externally connected to the cover 26 and extends downwardly through the cover 26 to a location in proximity to but spaced above the partition 46 to one side of the opening 44. The upper end of the conduit 48 is connected through a valve 52 to an outlet passageway 53 leading to that portion of the system to which the clarified liquid is to be supplied. An inspection port 50 forming no part of the present invention is provided in the cover 26 and a similar inspection port 51 is provided in the tank 12.

Figure 4:
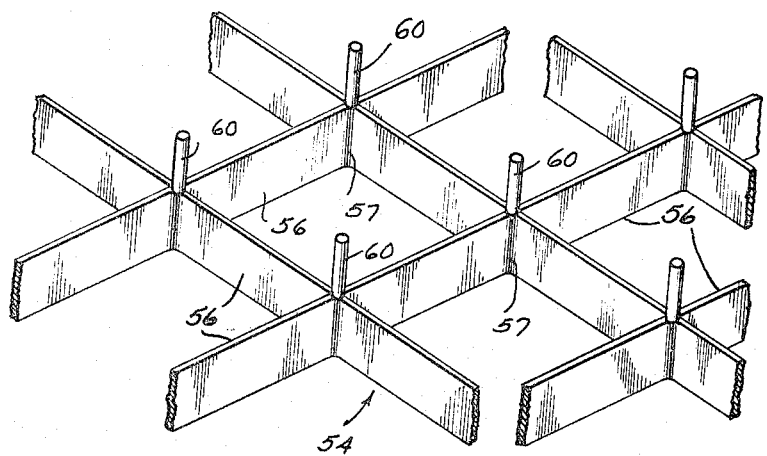
FIG. 4 is a fragmentary, pictorial view of a spacer member embodying certain features of the present invention and employed to maintain the tubular filter elements in fixed position within the filter tank.

Located near the bottom of the cylindrical tank portion 14 of the tank 12 is a bottom tube spacer 54 which, as best shown in FIG. 4, may be made up of a plurality of metallic strips or band-like portions 56 which are bonded together at a plurality of vertical intersections 57. The spacer 54 is thus formed of a plurality of strips of metal each having a vertical dimension substantially greater than the horizontal thickness which are welded together at the points of intersection to provide an extremely sturdy structure of generally honeycomb shape having a minimal horizontal surface area on which solids can collect during a filter cleaning operation or during a normal operating cycle. Alternatively, the spacer 54 may be formed of a suitable plastic which is self-supporting and rigid such, for example, as methyl methacrylate and in that case the spacer can be formed by molding. While the spacer 54 could be supported in the tank 12 by the walls defining the conical portion 16, to facilitate assembly of the filter tubes to the spacer 54 it is preferable to secure the spacer 54 in place by means of a plurality of tie rods 56 which extend through respective apertures in a plurality of plates 59 welded to the spacer 54 and in a plurality of plates 55 which lie across the lateral conduits 32 and are welded thereto. In this way, alignment of the spacer with the manifold conduits is assured and the entire tube assembly can be lifted as a unit out of the tank for replacement of the tubes or for general maintenance. As shown, the tie rods 56 are threaded at the outer ends thereof and are removably secured in place by means of hex-head nuts 58.

A plurality of pins or studs 60 are secured to and project upwardly from the spacer 54 at the points of intersection of the bands 56 and are respectively adapted to be loosely received in downwardly opening holes or cavities 62 in the tubular filter elements 64. The elements 64 are substantially identical and each comprises a hollow perforated core portion 66 closed off at the bottom by a cup-like imperforate member 68 suitably and sealably secured thereto.

Each filter element 64 is provided at the top with a cap 70 which is secured to the core portion 66 and to an internally threaded female coupling member 71 in which the lower threaded end of a fitting 73 is threadedly received. The upper end of the fitting 73 is also externally threaded and is received in the connector member 37. The cavity 62, into which the pin 60 extends is conveniently provided by means of a tube 75 which is welded at its top to the cap 68 and which is open at the bottom. In this embodiment of the invention the tubes are supported solely by the upper connector portion and the pins 60 are for the sole purpose of preventing lateral movement of the tubes 64 relative to one another and to the tank 12.

In order to provide a relatively fine, porous surface on which the usual pre-coat layer is deposited prior to initiation of a filter cycle, a fabric 77 is fitted over the perforate core portion 66 of the filter element. At the upper end of the tube 64 the fabric is held in place by means of a wire clamp 78 having an unstressed diameter less than the external unstressed diameter of an elastomeric bushing 80 which is tightly fitted onto the filter 64 directly below the hex-head connector 73. The fabric 77 is connected at the bottom of the filter tube 64 in a similar manner by means of a spring clamp 82 which compresses the fabric into an elastomeric tubular member 84 mounted directly below the cap 68. For convenience, the lower end of the fabric tube 77 is tucked up into the cavity 62 before the tube 64 is placed onto the pin 60.

Referring now to FIG. 5, there is shown another tube mounting construction for use with the filter 10 for replacing the mounting arrangement best illustrated in FIG. 3. In the embodiment of the invention shown in FIG. 5, the filter element 90 comprises a perforated core member 92 to which a bottom imperforate cap 93 is suitably secured and to which a top cap 94 having a central bore 95 therein is similarly secured. A tubular member 96 is secured to and depends axially from the bottom member 93 and a resilient elastomeric tube 98 is suitably secured therearound. A washer 100 having a central opening 101 therein is positioned over a pin 60. A helical coil spring 102 surrounds the pin 60 and acts against the washer 100 to press the filter tube 90 upwardly against the associated lateral conduit 32.

An internally threaded connector 104 is secured to the cap 94 in the aperture 95 and receive the externally threaded end 105 of a connector 106. The upper end 108 of the connector 106 is tubular and includes an annular groove 109 for receiving an O-ring type of resilient sealing gasket 110. The external diameter of the tubular portion 108 is greater than the internal diameter of the opening 34 in the associated lateral conduit 32 and therefore abuts against the bottom side of the conduit throughout an area surrounding the opening 34. A guide ring formed by a tube 112 is secured to the bottom of the lateral conduit around the opening 34 to prevent lateral movement of the filter tube 90 relative to the opening 34 and to provide a seal for preventing direct leakage of liquid into the manifold from the filter chamber.

An elastomeric tube 114 surrounds the connector 106 to provide a resilient surface against which the spring clamp 78 compresses the fabric sleeve 77. In this embodiment of the invention any particular filter tube 90 may be removed from the assembly merely by pressing it downwardly thereby to compress the spring 102 a sufficient amount such that the top end of the connector 106 is below the bottom end of the tube 112. The upper end of the tube 90 may then be moved in a transverse direction from beneath the tube 112 thereby to permit removal of the particular filter tube from the tube assembly.

In the embodiment illustrated in FIG. 5, the washer 100 is neither secured to the spring 102, nor to the filter tube 90. It could, however, be secured to either of these two parts should such a construction prove desirable for a particular application of the filter.

*Operation*

In order to operate the filter 10, whether it employs a filter tube mounting arrangement as illustrated in FIG. 3 or the arrangement illustrated in FIG. 5, the filter tube assembly is placed in the tank and the cover 26 is sealingly positioned onto the tank and secured thereto by means of a plurality of clamps 116, the drain 18 is closed by valve 17 and a liquid in which pre-coat solids are suspended is pumped through a valved inlet 118 at the bottom of the tank 12. The valve 52 in the outlet line connected to the line 48 is opened. In the external portion of the system the outlet will generally be connected back to the reservoir of pre-coat material. As the pre-coat liquid flows throughout the filter the pre-coat particles are trapped on the outer surfaces of the fabric layers on the tubes 64, thereby to deposit a porous filtering layer. When the pre-coat layer has increased to a sufficient thickness for proper filtering, the inlet 118 is connected to a source of liquid to be clarified and the outlet 48 is connected to that part of the system to which the clarified liquid is to be supplied. Liquid thus flows through the filter tube 64, the lateral conduits 32 and the header 30 to the inlet-outlet tube 36 for transmission to the chamber in the cover 26 and thence out through the outlet pipe 48. It will be noted that air is trapped in the dome chamber above the bottom of the outlet 48 and air is also trapped directly below the partition 46 at the upper end of the filter chamber. When the filter cake has reached a thickness where efficient operation is impaired and it thus becomes desirable to remove the filter cake from the filter leaves, the valve 52 in the outlet line 48 is closed while the inlet line 118 remains connected to a high pressure source of liquid. At this time a valve 122 in an outlet line 121 opening into the tank directly beneath the partition 46 is preferably open to permit the air previously trapped under the partition to be forced out of the filter as the liquid in the tank rises up under the partition. As the liquid thus flows into the filter chamber under pressure, the air collected in the cover or dome chamber is compressed to a pressure approaching line pressure and is indicated by a pressure gauge 119 mounted on the cover 26 and connected to the dome chamber therein. When this dome pressure has reached a sufficiently high value and the dome chamber has an amount of liquid in it substantially equal to or greater than the total volume of the filter tubes in the unit, the inlet 118 is closed off by means of a suitable valve 122. The valve 122 should be closed when liquid begins to flow through the outlet port 121 thus indicating that substantially all of the air previously trapped under the partition 46 has been exhausted from the filter. Thereafter, the drain line 18 is abruptly opened by means of valve 17. The air trapped in the dome chamber now expands and drives the liquid contained above the partition 46 and in the filter tubes in a reverse direction through the filter tubes to dislodge the filter cake which had previously been deposited thereon. The liquid which was located in the space directly below the partition 46 and above the manifold 28 washes off any solids which had collected on the manifold and on the upper ends of the filter elements as a result of sedimentation or the like. The dislodged cake now flows out of the tank through the drain 18. Thereafter, the drain 18 may be closed and the pre-coat cycle repeated to commence a succeeding filter cycle.

In accordance with an important feature of this invention, should the filter become bridged due to an excessive build-up of solids on the filter tubes, the cover 26 may be removed and since the cake is readily assessable through the spaces between the manifold header 30 and lateral conduits 32, the maintenance personnel can then remove the cake from the filter tubes with suitable means such as high velocity water jets and the like.

In the filter of FIG. 1 a single inlet-outlet tube 36 is provided for the entire manifold but under some circumstances it is preferable to employ two or more such inlet-outlet tubes connected at spaced apart locations to the header 30 and it will be understood that such a construction falls within the scope of the present invention.

Referring now to FIG. 6, there is shown another embodiment of the present invention which is, in many respects, quite similar to the filter 10 illustrated in FIG. 1. In order to facilitate an understanding of this filter, those parts which are similar or correspond to like parts of the filter 10 are identified by the same reference numerals but a prime has been added thereto. Accordingly, the filter of FIG. 6 is designated 10′ and comprises a generally vertical filter tank 12′ having a cylindrical wall portion 14′ connected at the bottom to an inverted, hollow conical portion 16′. A pair of U-shaped brackets 31′ are welded to the inner wall of the tank 14′ at diametrically opposite positions thereon at a substantial distance below the upper end 125 of the tank. The manifold assembly 28′ and associated filter elements is identical to the manifold assembly 28 and associated filter elements described and illustrated in connection with FIG. 1 and is mounted within the filter tank by the brackets 31′ and 33′ in exactly the same manner as the manifold 28 is mounted by the brackets 31 and 33 in the filter 10 of FIG. 1. The portions of the filter 10′ located below the manifold 28′ are identical to those of FIG. 1 and are not, therefore, described again. However, for a complete understanding of the construction and operation of the filter 10′ reference is directed to the description of the filter 10 taken in connection with FIG. 1.

Secured, as by welding, about the upper open end of the tank portion 14′ is an annular flange 126 having an annular groove 127 in the upper face thereof which receives a resilient annular sealing gasket 129. A cover 131 having a shallow domed cavity 132 therein is provided with an annular flange 134 which may be suitably welded about the lower edge thereof for mating with the flange 126 on the tank. The cover flange 134 has an annular groove 136 therein for receiving a resilient annular sealing gasket 138. Sandwiched between the flanges 136 and 134 is a partition member 46′ which has a depending dish-shaped central portion 140 terminating at its ends in an annular flared out or flat flange portion 142 which is sealingly fitted between the flanges 126 and 134 when the cover 131 is clamped to the tank by the clamps 116′. Centrally disposed in the partition 46′ is an aperture 44′ providing an inlet-outlet port. A flat tubular ring 42′ is suitably secured to the partition, as by welding, over the aperture 44′ for receiving the tubular connector 36′ of the header assembly 28′.

In the embodiment of the invention shown in FIG. 6 the cover 131 may be separated from the partition 46′ thus permitting access to the dome chamber for purposes of maintenance and the like. In addition, if it is desired to provide a rubber or other coating on the walls of the dome chamber this may be readily accomplished by disassembling the partition 46′ from the cover 131 and separately coating the surfaces of these two members. When it is necessary to obtain access to the filter elements if, for example, they should become bridged by the accumulation of an excessively large filter cake, the cover 131 may be removed and the partition 46′ may thereafter be removed to expose the manifold assembly 28′ and the associated filter elements. The entire manifold and filter tube assembly may now be lifted, as a unit, from the tank. In replacing the partition 46′ into the filter tank and onto the tubular connector 36′ no substantial difficulty is experienced inasmuch as the partition 46′ is a relatively light and rigid plate. It will be apparent to those skilled in the art that the partition 46′ can be more easily aligned with and assembled onto the tubular connector 36′ than is the case when the partition is integrally connected to the necessarily heavy cover member as in the embodiment of FIG. 1.

In operation of the filter 10′, during the pre-coat, filter and filter tube cleaning cycles, the various control valves are operated in the same sequence as that described for the filter 10 of FIG. 1 and in operation the filter 10′ is thus identical to the filter 10 of FIG. 1.

While the present invention has been described in connection with particular embodiments thereof, it will be understood that those skilled in the art may make many changes and modifications without departing from the true spirit and scope of the invention. Therefore, by the appended claims it is intended to cover all such changes and modifications as come within the true spirit and scope of this invention.

We claim:

1. A filter for clarifying a liquid having entrained solids suspended therein, comprising
   a tank having an open top,
   a plurality of conduits disposed in a plane and mutually interconnected to form a manifold,
   means removably mounting said manifold in said tank near the top thereof,
   an upstanding inlet tube extending upwardly from said manifold,
   said conduits having a plurality of openings in the bottom sides thereof,
   a plurality of tubular filter elements depending into said tank from said manifold with the cavity in each element communicating with the interior of said manifold through a respective one of said openings,
   spacer means mounted in said tank beneath said filter elements,
   said spacer means including a plurality of upstanding spaced apart projections, said projections each being respectively positioned directly under a one of said openings in said conduits, each said projection engaging a respective one of said elements thereby to hold said elements in vertical alignment,
   an inlet port, connected to said tank for supplying the liquid to be clarified thereto,
   a cover removably and sealingly connected to said tank over the top thereof,
   a partition in said cover cooperating with the walls of said cover to define a cover chamber having a volume no less than the combined internal volume of all said filter elements,
   a downwardly opening port in said partition for receiving said inlet tube from said manifold,
   sealing means sealably connecting said tube to said port to prevent leakage between the chamber in said cover and the chamber in said tank,
   an outlet for communicating said cover chamber externally of said filter to convey the filtered liquid from said filter, and
   valve means for controllably interrupting the flow of liquid from said cover chamber.

2. A filter as set forth in claim 1 where each said filter element has a downwardly opening cavity and said projections are respectively received in said cavities.

3. A filter as set forth in claim 2 where said spacer means comprises a unitary grid formed of intersecting bands, said projections being provided solely at the points of intersection of said bands.

4. A filter as set forth in claim 1 wherein said partition is dish-shaped and said port in said partition is axially positioned.

5. A filter as set forth in claim 2 further comprising a plurality of spring means respectively surrounding said projections and engaging said filter elements to urge them against said conduits.

6. A filter as set forth in claim 1 comprising a plurality of tie rods interconnected between said spacer means and said manifold for securing said spacer means, said manifold and said filter elements in a unitary assembly.

7. A filter for clarifying a liquid having entrained solids suspended therein, comprising
   a tank having an open upper end,
   a manifold,
   means mounting said manifold in said tank near said upper end,
   said manifold including a plurality of interconnected, spaced apart conduits,
   an inlet-outlet port opening upwardly from said manifold,
   a plurality of tubular filter elements depending from said conduits and communicating therewith,
   a cover sealably connected over said upper end of said tank,
   a partition extending across said cover and defining a sealable chamber in said cover,
   conduit means connecting said inlet-outlet port to said chamber when said cover is mounted on said tank; and
   an outlet in said cover connected between said chamber and the exterior of said tank, whereby the clarified liquid from said filter elements passes through said manifold, through said chamber and through said outlet in said cover.

8. A filter as set forth in claim 7 wherein said manifold consists of a longitudinally extending principal header member, and a plurality of lateral conduits extending in mutually parallel relationship from opposite sides of said header.

9. A filter for clarifying a liquid having entrained solids suspended therein, comprising
   a tank having an open upper end,
   a plurality of tubular filter elements,
   a cover adapted to be sealably secured over the upper end of said tank,
   a partition extending across said cover to define a chamber in said cover,
   said partition being generally dish shaped whereby the central portion depends a greater distance toward said tank than the peripheral portions
   means mounting said filter elements independent of said cover below said partition,
   means communicating said chamber to the cavities in said filter elements and an outlet duct mounted on the top of said cover and extending downwardly therefrom and terminating within said chamber.

10. A filter for clarifying a liquid having entrained solids suspended therein comprising
    a tank having an open top, a plurality of conduits disposed in a plane and mutually interconnected to form a manifold,
    bracket means secured to said tank for removably mounting said manifold in said tank at a location spaced downwardly from the top thereof,
    an upwardly facing inlet-outlet connection communicating with said manifold,
    said conduits having a plurality of openings in the bottom sides thereof,
    a plurality of tubular filter elements depending into said tank from said manifold with the cavity in each element communicating with the interior of said manifold through a respective one of said openings,
    an inlet port connected to said tank for supplying the liquid to be clarified thereto,
    a dished partition secured over the top of said tank with the dished portion depending into said tank,
    a downwardly opening connection in said partition mating with said connection in said manifold thereby to provide communication between said manifold and the upper side of said partition,
    a cover removably and sealably connected to said tank over said partition thereby to cooperate with said partition to provide a chamber in said cover having a volume at least substantially as great as the combined internal volume of all said filter elements,
    an outlet from said cover for conveying the filtered liquid from said filter,
    valve means for controllably interrupting the flow of liquid from said chamber in said cover, and
    valve means for controllably interrupting the flow of liquid to said tank.

11. A filter for clarifying a liquid having entrained solids suspended therein comprising
    a tank having an open top, a plurality of conduits disposed in a plane and mutually interconnected to form a manifold,
    bracket means secured to said tank for removably mounting said manifold in said tank at a location spaced downwardly from the top thereof,
    an upwardly facing inlet-outlet connection communicating with said manifold,
    said conduits having a plurality of openings in the bottom sides thereof,
    a plurality of tubular filter elements depending into said tank from said manifold with the cavity in each element communicating with the interior of said manifold through a respective one of said openings,
    an inlet port connected to said tank for supplying the liquid to be clarified thereto,
    a partition secured over the top of said tank,
    a downwardly opening connection in said partition mating with said connection in said manifold thereby to provide the sole connection between said manifold and the upper side of said partition,
    a cover removably and sealably connected to said tank over said partition thereby to cooperate with said partition to provide a chamber in said cover having a volume at least substantially as great as the combined internal volume of all said filter elements,
    an outlet from said cover for conveying the filtered liquid from said filter,
    valve means for controllably interrupting the flow of liquid from said chamber in said cover, and
    valve means for controllably interrupting the flow of liquid to said tank.

12. A filter for clarifying a liquid having entrained solids suspended therein, comprising
    a tank having an open top,
    a plurality of conduits disposed in a plane and mutually interconnected to form a manifold,
    means for removably mounting said manifold in said tank near the top thereof,
    an upwardly facing inlet-outlet connection communicating with said manifold,
    said conduits having a plurality of spaced openings therein,
    a plurality of tubular filter elements depending from said manifold into said tank with the cavity in each element communicating with the interior of said manifold through a respective one of said openings,
    an inlet port connected to said tank for supplying the liquid to be clarified thereto,
    a cover removably and sealably connected to said tank over said open top thereof,
    a partition sealably connected to said cover to define a chamber in said cover above said partition, and having a downwardly opening connection therein mating with said inlet-outlet connection of said manifold to connect said manifold to said chamber,
    an outlet in said cover above said partition for conveying the clarified liquid from said chamber,
    valve means for controllably interrupting the flow of liquid from said outlet in said cover, and
    valve means for controllably interrupting the flow of liquid to said inlet port.

13. A filter as set forth in claim 12 comprising,
    a second outlet port opening into said cover adjacent to and beneath said partition,
    and valve means for controlling the flow of fluid from said second outlet port.

14. A filter for clarifying a liquid having entrained solids suspended therein, comprising
    a tank having an open top,
    a plurality of conduits disposed in a plane and mutually interconnected to form a manifold,
    means removably mounting said manifold in said tank near the top thereof,
    an inlet-outlet port in said manifold opening upwardly therefrom,
    said conduits having a plurality of openings in the bottom sides thereof,
    a plurality of tubular filter elements depending into said tank from said manifold with the cavity in each element communicating with the interior of said manifold through a respective one of said openings,
    spacer means secured to said filter elements near the lower ends thereof for holding said filter elements in vertical alignment,
    an inlet port connected to said tank for supplying the liquid to be clarified thereto,
    a cover removably and sealingly connected to said tank over the top thereof, a partition in said cover cooperating with the walls of said cover to define a cover chamber having a volume no less than the combined internal volume of all said filter elements, a downwardly opening port in said partition, means for sealably interconnecting said port in said partition to said port in said manifold to prevent leakage between the chamber in said cover and the chamber in said tank, an outlet for communicating said cover chamber externally of said filter to convey the filtered liquid from said filter, and valve means for controllably interrupting the flow of liquid from said cover chamber.

15. A filter as set forth in claim 14 wherein said manifold and said filter elements are removable as a unit from said tank.

References Cited by the Examiner
UNITED STATES PATENTS

| | | | |
|---|---|---|---|
| 2,767,851 | 10/1956 | Muller | 210—233 X |
| 2,826,308 | 3/1958 | Koupal | 210—333 X |
| 2,862,622 | 12/1958 | Kircher et al. | 210—333 |
| 3,168,469 | 2/1965 | Abdalian et al. | 210—333 X |

REUBEN FRIEDMAN, *Primary Examiner.*

J. L. DE CESARE, *Assistant Examiner.*